(12) United States Patent
Peiker

(10) Patent No.: US 6,603,959 B1
(45) Date of Patent: Aug. 5, 2003

(54) HOLDER FOR A RADIO TELEPHONE

(76) Inventor: Andreas Peiker, Max-Planck-Strasse 32, 61381 Friedrichsdorf (DE)

( * ) Notice: Subject to any disclaimer, the term of this patent is extended or adjusted under 35 U.S.C. 154(b) by 0 days.

(21) Appl. No.: 09/578,416

(22) Filed: May 26, 2000

(30) Foreign Application Priority Data

May 28, 1999 (DE) ..................................... 299 09 215 U

(51) Int. Cl.⁷ .............................. H04B 1/38; H04M 1/00
(52) U.S. Cl. ...................... 455/90.1; 455/569; 455/347; 379/455; 379/445; 379/446
(58) Field of Search ................. 455/90.1, 575, 455/569, 573, 347, 348, 550; 379/454, 455, 446, 445, 426

(56) References Cited

U.S. PATENT DOCUMENTS

| | | | | |
|---|---|---|---|---|
| 5,142,573 A | * | 8/1992 | Umezawa | 379/454 |
| 5,282,246 A | | 1/1994 | Yang | 379/455 |
| 5,480,115 A | * | 1/1996 | Haltof | 248/221.11 |
| 5,652,792 A | * | 7/1997 | Gallagher et al. | 379/446 |
| 5,828,750 A | * | 10/1998 | Perala | 379/446 |
| 5,836,496 A | * | 11/1998 | Levin et al. | 224/553 |
| 5,995,622 A | * | 11/1999 | Roussy et al. | 379/446 |
| 6,043,626 A | * | 3/2000 | Snyder et al. | 320/113 |
| 6,138,041 A | * | 10/2000 | Yahia | 455/569 |
| 6,229,893 B1 | * | 5/2001 | Chen | 379/454 |

FOREIGN PATENT DOCUMENTS

| | | |
|---|---|---|
| DE | 91 02 981 | 6/1991 |
| DE | 4433 363 | 5/1996 |
| DE | 297 05 230 | 10/1997 |
| DE | 297 22539 | 4/1998 |
| DE | 297 22540 | 5/1998 |
| DE | 298 21 166 | 2/1999 |
| GB | 2 317 530 | 3/1998 |
| JP | 7-135521 | 5/1995 |
| WO | WO 97/25223 | 4/1997 |
| WO | WO 98/40244 | 9/1998 |

* cited by examiner

Primary Examiner—Duc Nguyen
(74) Attorney, Agent, or Firm—Morgan, Lewis & Bockius LLP

(57) ABSTRACT

A retaining apparatus for holding and making contact with a radio telephone comprises a shell having a slide into which the radio telephone is inserted wherein the slide is displaced linearly with respect to the inserted radio telephone, and wherein either the slide or the shell has at least one contact unit for data and power transmission and for electrical and optical coupling to at least one interface on the radio telephone.

4 Claims, 3 Drawing Sheets

HOLDER FOR A RADIO TELEPHONE

FIELD OF THE INVENTION

The invention relates to an apparatus for holding and making contact with a radio telephone.

Apparatuses of this type are used in vehicles in order to securely retain a radio telephone and to connect it electrically to components stored in the vehicle, such as, for example, hands-free devices and external antennae on vehicles.

DESCRIPTION OF THE RELATED ART

A holder of this type is disclosed in WO 97/25223. This holder has a holding shaft which can be rotated about a horizontal axis and has a contact unit into which the telephone set is inserted by its end near to the mouthpiece. The radio telephone is locked in the holder by combined pivoting of the radio telephone together with the holding shaft into the horizontal. In this position, that end of the radio telephone which is near the earpiece is grasped by a claw and held there in the horizontal. The holder for the radio telephone is held by a receptacle in a latching and re-detachable manner, so that the radio telephone can also be taken out of the receptacle together with the holder.

Furthermore, a holder of this type is disclosed in WO 98/40244. This holder essentially comprises a holding shell with a contact unit into which the radio telephone is first of all place obliquely by its end near to the mouthpiece. This movement is followed by a rotational movement of the radio telephone around that end which is near to the mouthpiece and onto the holding shell. In this position, the end which is near to the earpiece is then engaged over by a spring-mounted claw.

The prior art also discloses a holder for radio telephones, in which the radio telephone is first of all latched into a holder. Contact is then made via a cable whose plug is mounted displaceably in a guide which is opened upward and is arranged in the holder. To make the contact, this plug is pushed by hand in the direction of the radio telephone. The plug latches with latching tabs in the plug socket in the radio telephone. Owing to the fact that the guide for the plug is opened upward, the radio telephone can be removed from the holder together with the plug and the associated cable. The radio telephone mounted in the holder is decoupled from the plug by a complicated pulling and pushing movement used to decouple the plug by hand from the plug socket on the radio telephone. This decoupling movement is difficult, since the plug can only be grasped with difficulty, and at the same time as the pulling movement a pushing movement also has to be carried out, in order to release the latching of the plug from the plug socket in the radio telephone.

SUMMARY OF THE INVENTION

The invention is based on the object of developing an apparatus for holding and making contact with a radio telephone, which apparatus can be operated in a simple manner and can be produced cost-effectively.

A further object of the invention is to propose an apparatus for holding and making contact with a radio telephone, which apparatus is suitable both for the reliable contact of electrical connections, in which the radio telephone has pins and the plug has sleeve- or fork-shaped master contacts, and for electrical connections, in which the radio telephone has contact surfaces and the plug has resilient contact pins.

According to the invention, this object is achieved in conjunction with the preamble of claim 1 by the defining features of patent claim 1.

The apparatus according to the invention for holding and making contact with a radio telephone comprises a shell, in which the radio telephone is inserted by its rear side, and a slide which has a contact unit for the electrical and/or mechanical engagement in an interface on the radio telephone. The linearly moveable slide enables electrical contact between the apparatus and the radio telephone to be produced in a simple manner. Tilting of the contact unit with respect to the interface is reliably avoided by the guides on the slides. Even a radio telephone whose interface has pins can therefore be made contact with rapidly, reliably and without the risk of damage to the pins. The slide furthermore ensures that the telephone can be grasped readily.

According to an advantageous embodiment of the subject matter of the invention, a region of the holder which is opposite the slide engages over the radio telephone. It is thereby achieved that as soon as the slide is pushed on, the radio telephone is retained securely in the holder by two sides and remains in the holder even in the event of a traffic accident.

It is furthermore advantageous if a spike which is arranged on the holder opposite the slide engages in the housing of the radio telephone. The radio telephone is likewise reliably retained thereby in the holder.

According to a particularly preferred embodiment of the subject matter of the invention, provision is made for the slide to latch in at least one of its positions. In this case, provision may be made for the slide to latch in the position which retains the radio telephone and/or in the position which releases the radio telephone. This has the advantage that in the slide position retaining the radio telephone, the contact remains secure even during vibrations and even if the contact itself does not have any auxiliary means which prevent the contacts from becoming detached. Latching of the slide in the position releasing the radio telephone is advantageous, since the radio telephone, after being removed, can then immediately be inserted back into the holder without having to push the slide back beforehand.

It is furthermore advantageous if the slide is blocked by means of a mechanical or electrical block in its position which releases the radio telephone, as long as the radio telephone is not correctly located in the shell for holding the telephone. This prevents the slide from inadvertently being pushed into the position retaining the radio telephone and therefore making the insertion difficult. Furthermore, this device protects the radio telephone and the holder from damage, since the slide is prevented from being pushed into the position retaining the radio telephone, as long as the radio telephone is still not correctly located in the receptacle.

According to a particularly advantageous embodiment, the radio telephone is supported on the shell against a pulling-off movement and against a pushing-on movement of the slide. This prevents the radio telephone from becoming wedged under the shell during the pulling-off movement and prevents the radio telephone from being pushed out of the shell during the pushing-on movement.

It is furthermore advantageous if the cable leading to a hands-free and remote control device is connected directly to the slide. Complicated cable routing from the shell of the holder to the slide of the holder is therefore avoided and cost-effective production of the holder furthered.

BRIEF DESCRIPTION OF THE DRAWINGS

In this case

DESCRIPTION OF THE EXEMPLARY EMBODIMENTS

Figure 1:
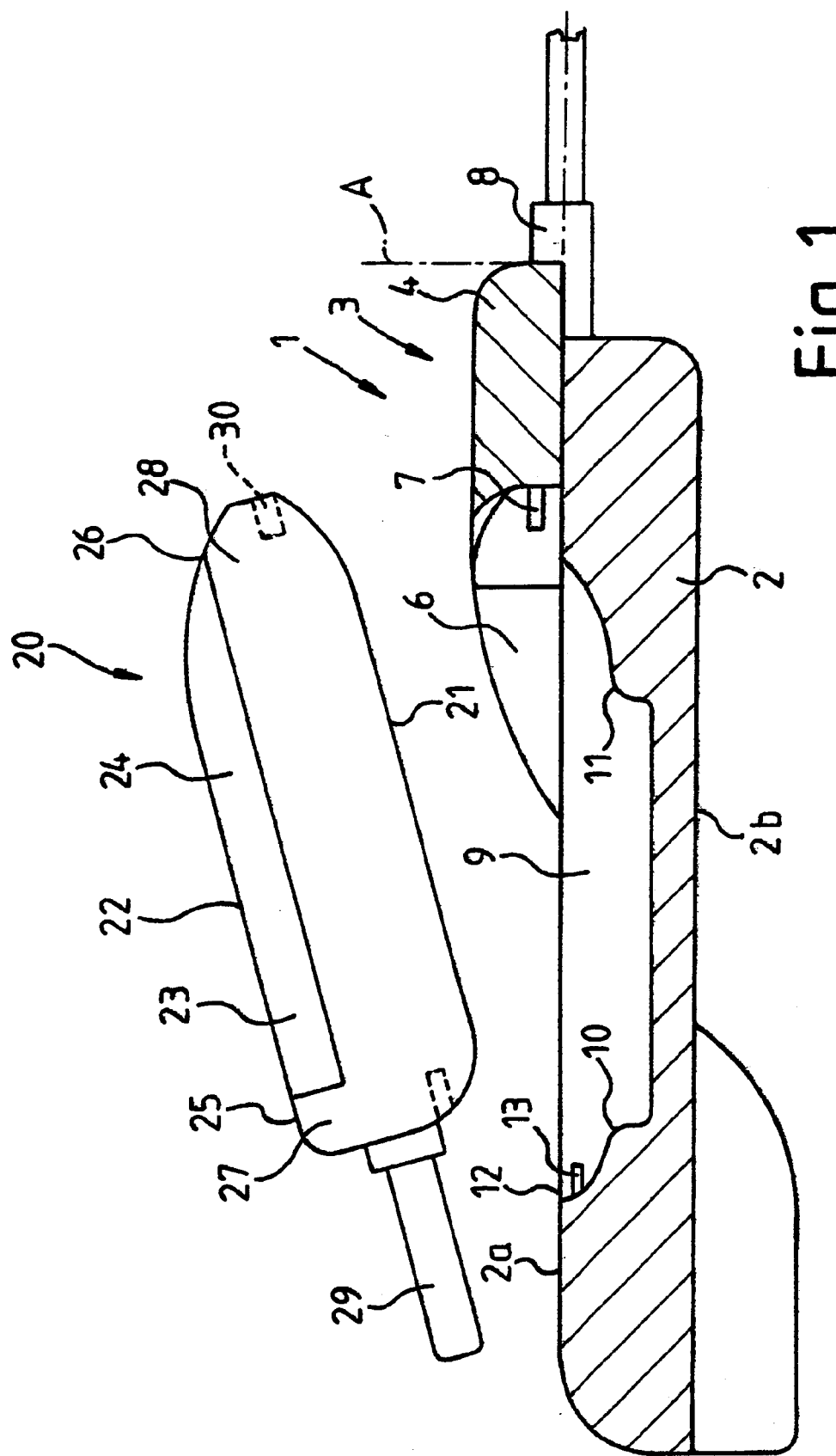
FIG. 1 shows a radio telephone and a holder in which the slide is situated in a position releasing the radio telephone.

In FIG. 1, a holder 1 is illustrated in a cut away side view. The holder 1 comprises a shell 2 having an upper side 2a and a lower side 2b. A slide 3 is mounted in a linearly moveable manner on the upper side 2a of the shell 2. The slide 3 has a slide head 4 with grip depressions 5, which cannot be seen in the view of FIG. 1, and a slide extension arm 6. The slide 3 furthermore has a contact unit 7 which is mounted on the slide head 4. The contact unit 7 is connected electrically to a cable supply 8.

The shell 2 has a depression 9 on its upper side 2a. This depression has shoulders 10, 11. The depression 9 furthermore has a rear grip 12 opposite the slide 3. This rear grip 12 is illustrated as a tab 13 in FIG. 1. According to a design variant which is not illustrated, the rear grip 12 is designed as an overlap.

FIG. 1 also illustrates a radio telephone 20 in side view. The radio telephone 20 has a rear side 21 and a front side 22, the front side 22 having a display 23, a keypad 24, an earpiece 25 and a mouthpiece 26. In the region of the earpiece 25, the radio telephone 20 forms a head region 27. In the region of the mouthpiece 26, the radio telephone 20 forms a bottom region 28. An antenna 29 is formed in the head region 27 and an interface 30 is formed in the bottom region 28.

Figure 2:
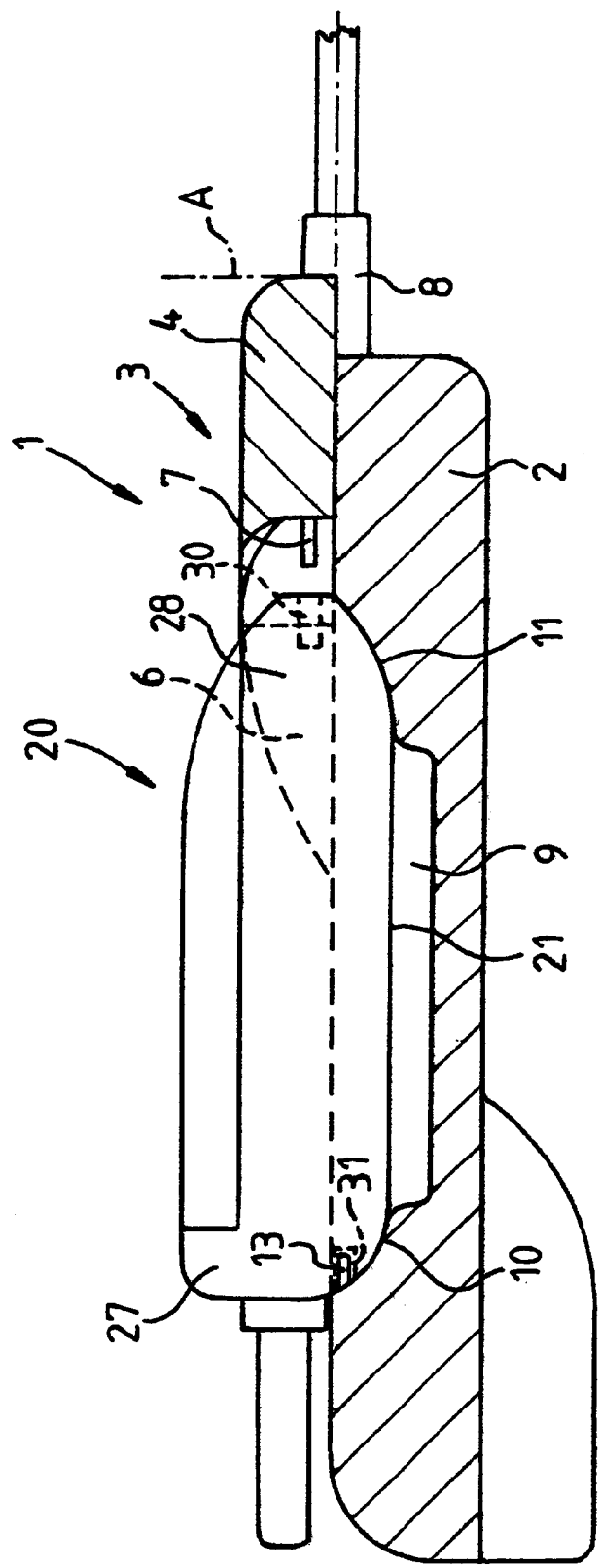
FIG. 2 shows a holder having an inserted radio telephone, in which the slide is situated in a position releasing the radio telephone.

FIG. 2 shows the holder 1 with an inserted radio telephone 20 in side view. The slide 3 of the holder 1 is situated in a position A which releases the radio telephone 20. The radio telephone 20 is located with its rear side 21 in the depression 9 of the holder 1. In this position, the tab 13 engages in a recess 31 in the head region 27 of the radio telephone 20. The engagement of the tab 13 in the recess 31 is produced by the radio telephone 20 initially being placed with its head region 27 against the shoulder 10 of the depression 9 of the shell 2. It is then pivoted in the clockwise direction in such a manner that it comes to lie with its bottom region 28 and its rear side 21 on the shoulder 11 of the depression 9. It can be seen in FIG. 2 that the contact unit 7 and the interface 30 are not in engagement with each other in the position A of the slide 3. The slide head 4 also has no contact with the bottom region 28 of the radio telephone 20. The slide extension arm 6 lies over the depression 9 of the shell 2 in such a manner that it does not conceal the depression 9 and therefore permits trouble-free insertion of the radio telephone 20. It can furthermore be seen in FIG. 2 that the cable supply 8 is supported on the shell 2 and is therefore not moved together with the slide 3. The length between the contact unit 7 and the cable supply 8 is made up for by cables, which are not illustrated in FIG. 2, which can move freely in the internal region of the slide head 4 and of the shell 2. According to a design variant which is not illustrated, the cable supply 8 is mounted directly on the slide head 4 and is moved together with the latter.

According to a further design variant, provision is made for the cable supply 8 to be attached to the shell 2 and for the contact from the shell 2 to the slide head 4 and to the contact unit 7 to be made via sliding contacts.

According to a design variant (not illustrated) of the tab 13, the rear grip 12 is designed as an overlap which engages over the head region 27 of the radio telephone 20 as far as the display 23.

Figure 3:
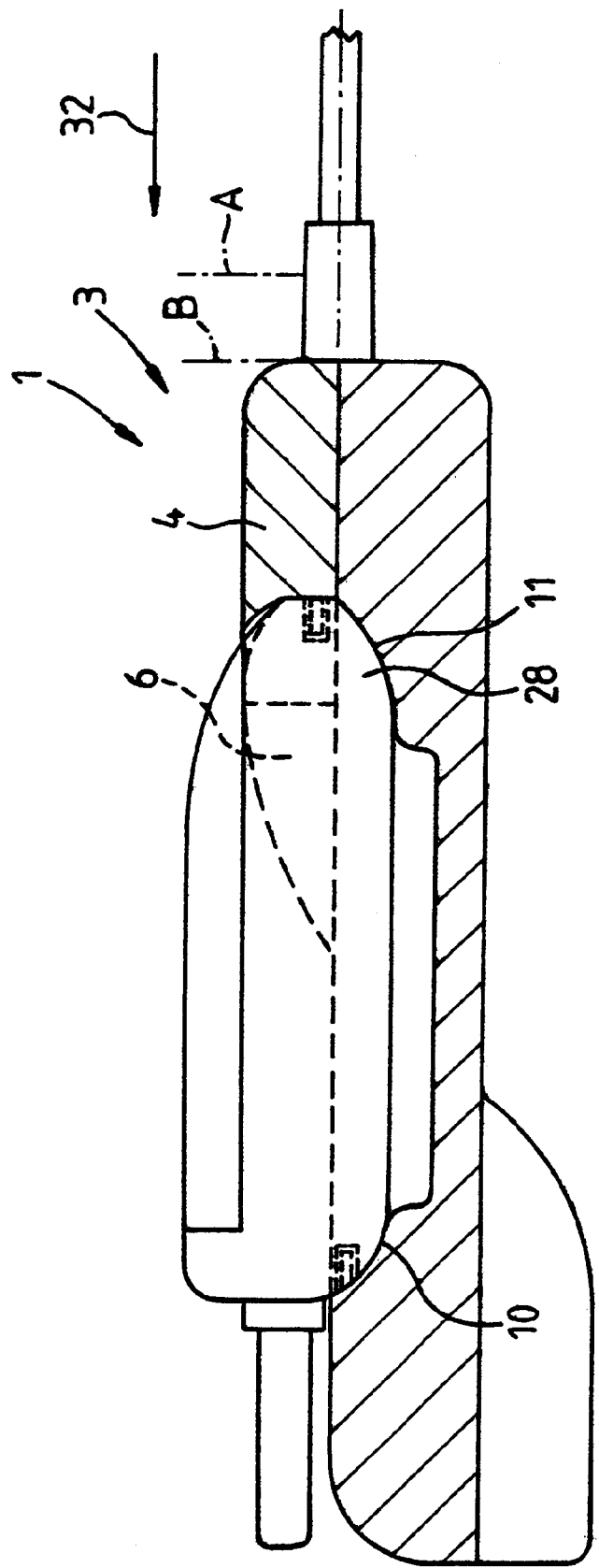
FIG. 3 shows a holder with an inserted radio telephone, in which the slide is situated in a position retaining the radio telephone.

FIG. 3 again shows a cut away side view of the holder 1 with an inserted radio telephone. In contrast to FIG. 2, in FIG. 3 the slide 3 is situated in a position B which retains the radio telephone. In this position B, the slide head 4 has contact with the bottom region 28 of the radio telephone 20 and engages over said bottom region. Furthermore, the slide extension arm 6 engages over the bottom region 28 of the radio telephone 20 in regions situated to the left and right of the mouthpiece 26. These overlaps mean that the radio telephone 20 is retained securely in the shell 2 of the holder 1. The contact of the interface 30 of the radio telephone 20 by the contact unit 7 of the slide 3 takes place in FIG. 3. The contact unit 7 is pushed together with the slide 3 in a linear movement in the direction of the arrow 32 onto the bottom region 28 of the radio telephone 20. This effectively prevents the contact unit 7 from tilting with respect to the interface 30 and making the pushing-on more difficult. It is not possible for the radio telephone 20 to be deflected before the pushing-on movement, since the radio telephone 20 is supported by the head region 27 on the shoulder 10 of the recess 9 counter to the arrow direction 32.

The radio telephone 20 is removed from the holder 1 by pulling back the slide 3 counter to the arrow direction 32. During this pulling back, the radio telephone 20 is supported by the bottom region 28 against the shoulder 11 of the shell 9. This prevents the radio telephone 20 from becoming wedged under the slide 3. As the slide 3 is pulled back, the radio telephone 20 is freed from being covered by the slide extension arm 6, and at the same time the electrical connection between the contact unit 7 and the interface 30 is released. The slide 3 latches in the position A which releases the radio telephone.

The latching arrangement for the slide 3 on the shell 2 is designed in such a manner that the slide 3 has depressions into which a ball which is spring-mounted on the shell snaps. This latching can be released by increasing the pushing pressure.

According to a design variant (not illustrated) provision is made for spring arms to be provided as the latching elements, said arms engaging in recesses in the slide 3 and being able to be guided out of these recesses again via push buttons.

A further constructional variant (not illustrated) makes provision for the bottom region 28 of the radio telephone 20 not to be overlapped by the slide 3. The radio telephone 20 is fixed in place exclusively via the contact unit 7 and the interface 30. In this case, the contact unit 7 is in positive-locking engagement with the interface 30.

Furthermore, a design variant (not illustrated) is provided in which three contact units engage in three interfaces. In this case, the central contact unit and the central interface are designed as an electrical contact unit. The two other pairs of couplings are designed as mechanical pairs of couplings which serve for centering the electrical pair of couplings and for holding the radio telephone.

The invention is not restricted to illustrated or described exemplary embodiments. Rather, it also comprises developments of the invention within the scope of the protective claims. In particular, the invention also provides data and/or power transmission from radio telephones to the holder and vice versa. This can take place contactlessly, for example via an infrared interface or the like, or via mechanical contact-making means.

What is claimed:

1. A retaining apparatus for holding and making contact with a radio telephone having a first end and a second end opposite the first end, the apparatus comprising:

a shell having a depression with a fixed length to receive the first and second ends of the radio telephone; and a slide slideably coupled to said shell to engage the first end of the radio telephone, wherein the slide is displaced linearly toward the depression to engage the first end of the radio telephone, wherein either the slide or the shell has at least one contact unit for data and power transmission and for electrical coupling to at least one interface on the radio telephone; and wherein a tab is arranged opposite the slide and engages a head region of the radio telephone.

2. A retaining apparatus for holding and making contact with a radio telephone having a first end and a second end opposite the first end, the apparatus comprising:

a shell having a depression with a fixed length to receive the first and second ends of the radio telephone; and a slide slideably coupled to said shell to engage the first end of the radio telephone, wherein the slide is displaced linearly toward the depression to engage the first end of the radio telephone, wherein either the slide or the shell has at least one contact unit for data and power transmission and for electrical coupling to at least one interface on the radio telephone; and wherein a radio telephone release on the slide is blocked by a mechanical or electrical means when the radio telephone is not correctly located in the shell.

3. A retaining apparatus for holding and making contact with a radio telephone, comprising:

a shell having a slide into which the radio telephone is inserted, wherein the slide is displaced linearly with respect to the inserted radio telephone, and wherein either the slide or the shell has at least one contact unit for data and power transmission and for electrical coupling to at least one interface on the radio telephone, and wherein a tab is arranged opposite the slide and engages a head region of the radio telephone.

4. A retaining apparatus for holding and making contact with a radio telephone, comprising:

a shell having a slide into which the radio telephone is inserted, wherein the slide is displaced linearly with respect to the inserted radio telephone, and wherein either the slide or the shell has at least one contact unit for data and power transmission and for electrical coupling to at least one interface on the radio telephone, and wherein a radio telephone release on the slide is blocked by a mechanical or electrical means when the radio telephone is not correctly located in the shell.

* * * * *